Sept. 22, 1931.  M. COUPIER  1,824,261
LIQUID MEASURING AND DELIVERING APPARATUS
Filed Nov. 5, 1928  5 Sheets-Sheet 4

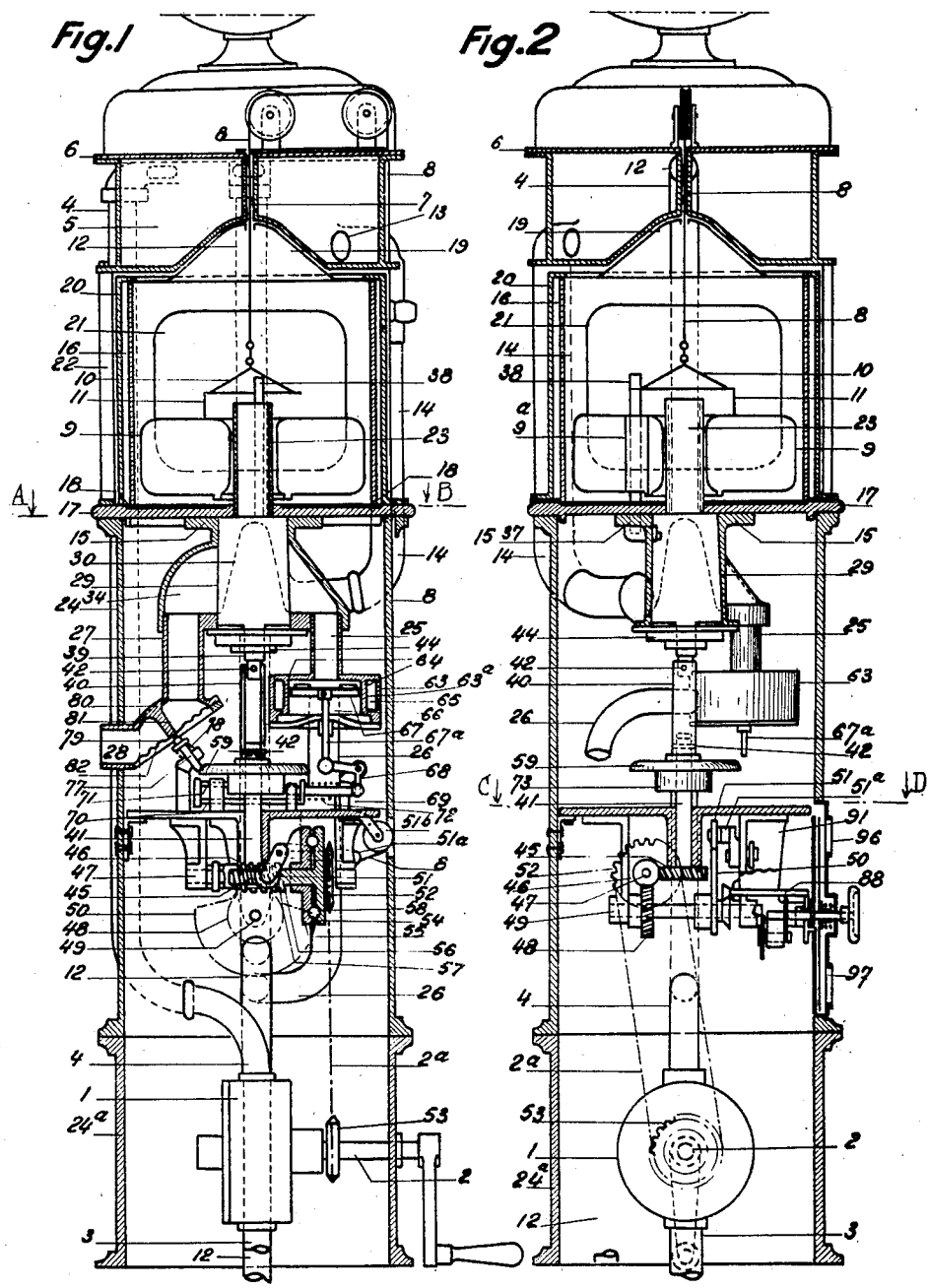

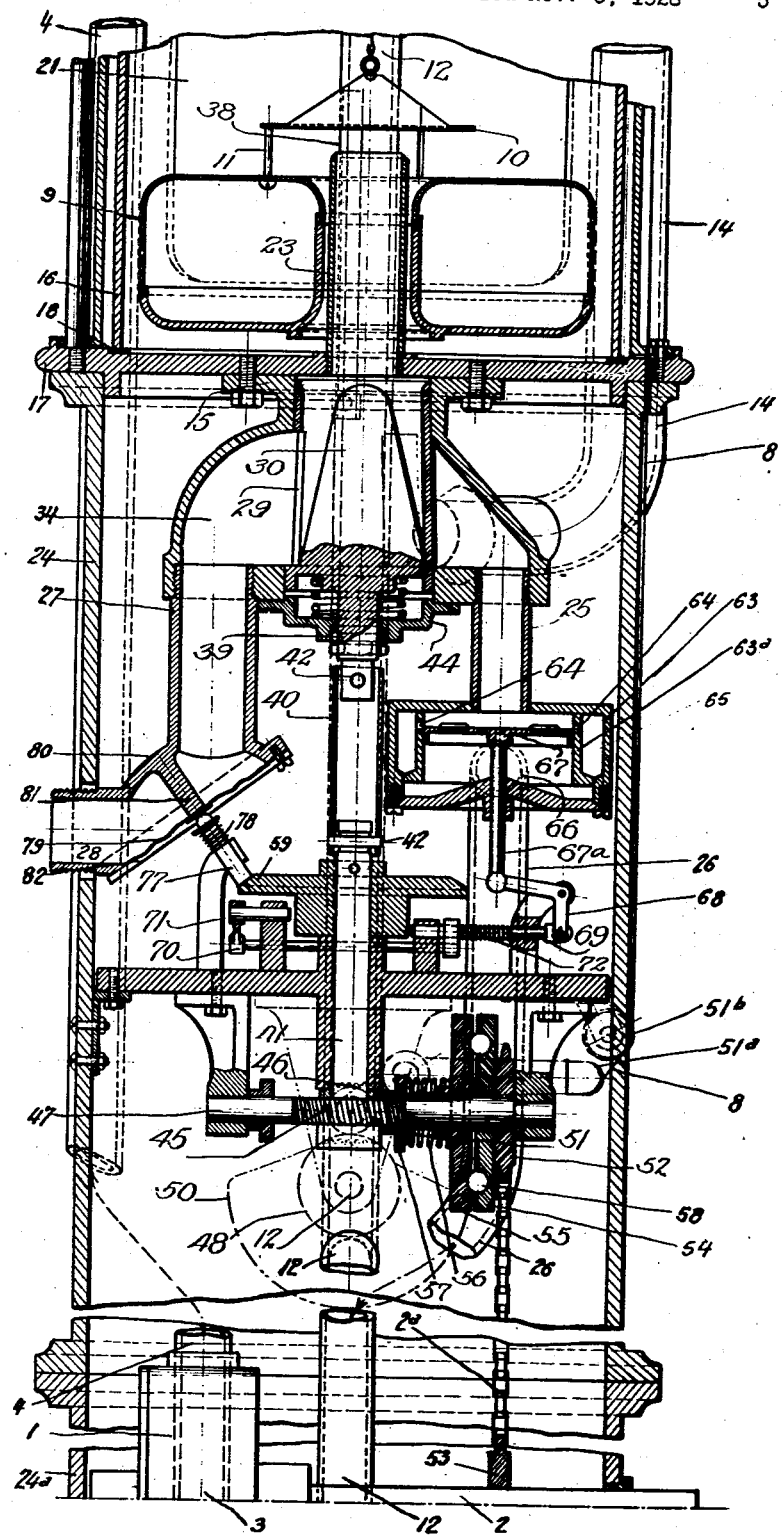
Fig.1ª

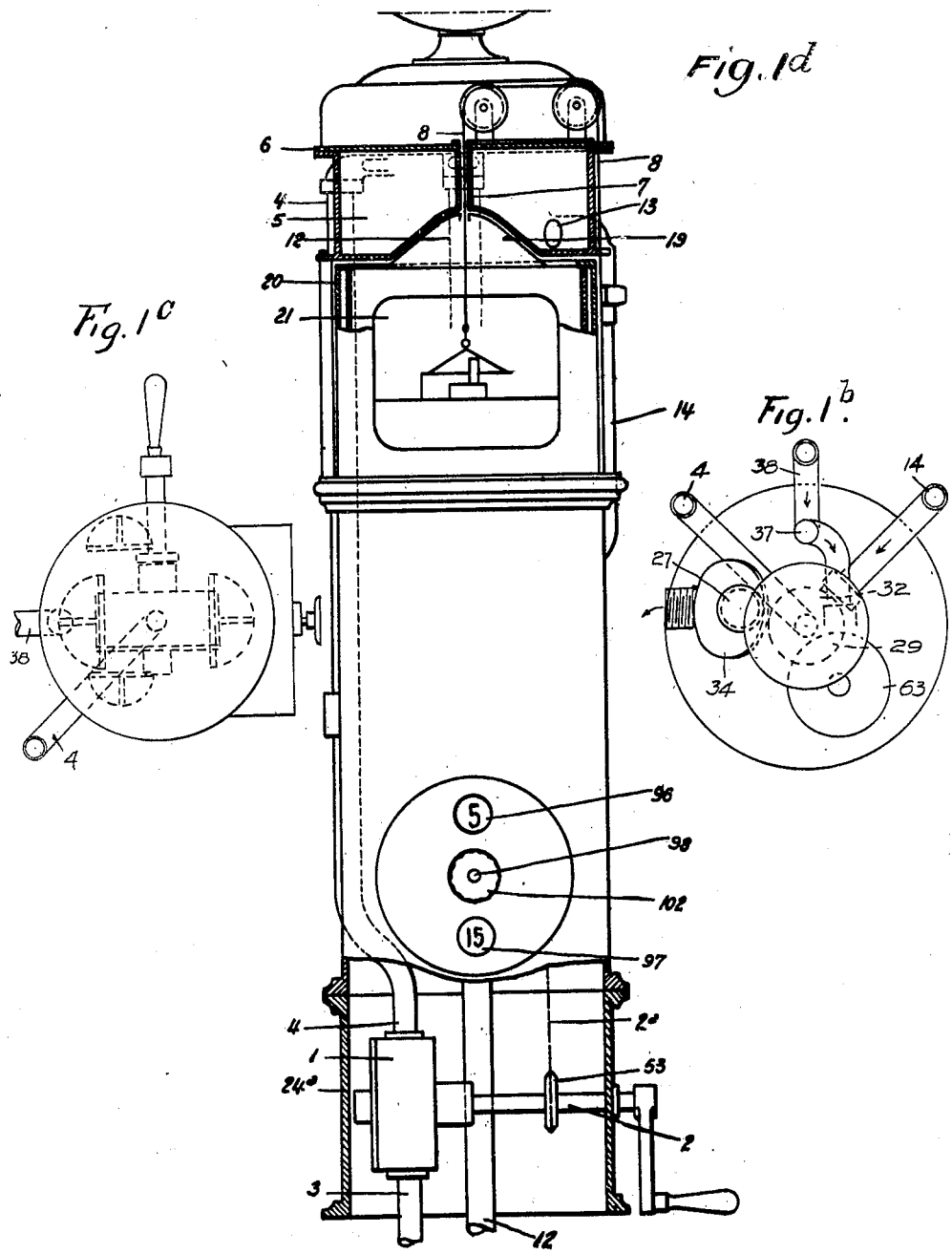

Marcel Coupier
INVENTOR;
By (signature)
his Attorney.

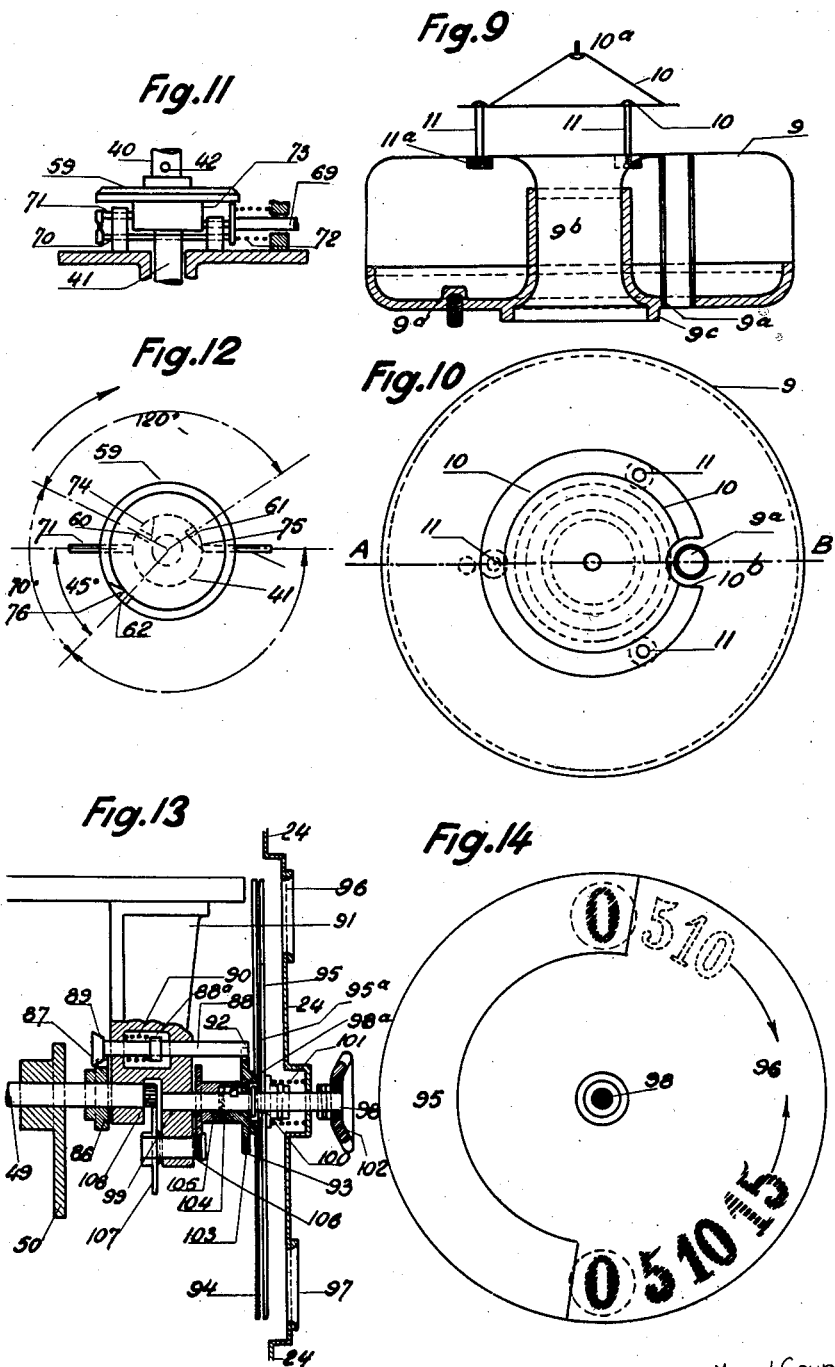

Patented Sept. 22, 1931

1,824,261

UNITED STATES PATENT OFFICE

MARCEL COUPIER, OF PARIS, FRANCE

LIQUID MEASURING AND DELIVERING APPARATUS

Application filed November 5, 1928. Serial No. 317,160.

The present invention relates to the type of liquid measuring and delivering apparatus wherein the delivery of an accurately predetermined volume of liquid (such for instance as gasoline) is performed by the complete immersion of a plunger of equal volume in a suitably sized vessel, said immersion taking place underneath a level that has been previously obtained by an overflowing operation consisting in bringing the liquid level with the upper end of the overflow pipe through which the measured volume of liquid is delivered, said overflow pipe being associated with a multiple way cock the rotation of which simultaneously performs the preadmission of the liquid to be delivered, the overflow levelling of the excess of liquid and lastly the discharge of the liquid forced by the plunger as it is gradually immersed, the immersion and motions of the plunger being combined with the rotation of the cock according to a suitable continuous cyclic process which in turn is combined with the motion of the pump or other liquid feeding device.

The primary object of the invention is to generally improve the liquid delivery so as to prevent it from being started before the initial levelling thereof has been obtained owing to the liquid having gushed out of the overflow pipe till its level is flush with the upper end thereof.

A further object of the invention is to prevent the liquid delivery from being interrupted as long as the whole quantity of liquid corresponding to the immersed plunger has not been fully delivered.

A still further object of the invention is to prevent wrong quantities of liquid from being delivered while allowing of a resumption of the liquid delivery as soon as the operative conditions for a right liquid delivery are resumed in the apparatus whereby the operation of said apparatus can always be rendered satisfactory.

A still further object of the invention is to permit an overlapping of the liquid delivery cycles of the apparatus while ensuring at all times correct liquid deliveries and while thus preventing any undue stoppage of the apparatus when the liquid is being delivered.

A still further object of the invention is to provide for an easy replacement of the glass bell or vessel without necessitating a new adjustment of the delivery means.

With these and such other objects in view as will be apparent from the following description, the invention comprises the novel construction and arrangement of parts as will now be described with reference to the accompanying drawings wherein is shown a preferred embodiment of the invention.

In the drawings:

Fig. 1 is an elevation partly in section of the whole apparatus.

Figure 1a is a substantially longitudinal sectional view corresponding to Figure 1, except that the showing is on a larger scale.

Figure 1b is a sectional view taken on the line A—B of Figure 1.

Figure 1c is a sectional view taken on line C—D of Figure 2.

Figure 1d is a front elevational view of the liquid dispensing and measuring apparatus with parts broken away to disclose otherwise hidden portions.

Fig. 2 is an elevation, partly in section, taken at right angles to Fig. 1 of the apparatus, assuming several parts thereof having been removed for the sake of clearness.

Fig. 9 is a vertical diametrical section of the plunger and associated support, this section being taken on the line A—B (Fig. 10).

Fig. 10 is a plan view of the plunger and associated support.

Fig. 11 is a fragmentary side elevation showing the plate fixed to the lower end of the tail extension of the rotary shell of the cock, as shown in Fig. 3.

Fig. 12 is a plan view of the plate shown in Fig. 11, notches being provided in the periphery and cylindrical wall of said plate for the engagement of latches.

Fig. 13 is an elevation partly in section of the device driving the dials of the meter embodied in the apparatus.

Fig. 14 is a front view of the dials.

Figures 3, 7:
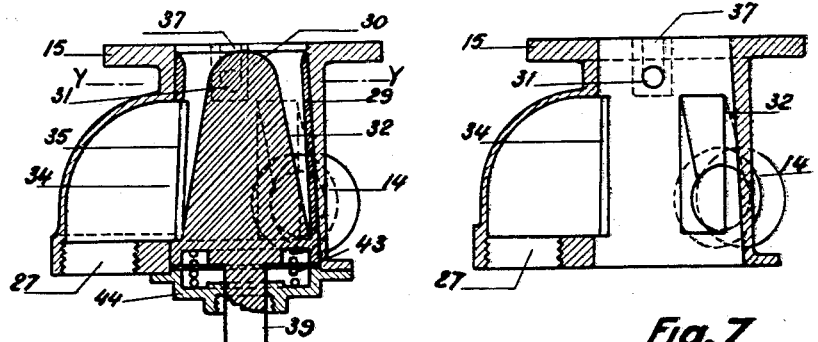
Fig. 3 is a vertical section on the line $x$—$x$ (Fig. 4) of the three way cock embodied in the apparatus showing the structure of its rotary shell.
Fig. 7 is a detached vertical diametrical section of the cock, this section being taken on the line $x$—$x$ (Fig. 4).
Figure 8:
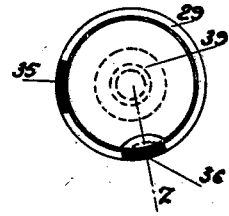
Fig. 8 is a top plan view of the cock shell.
Figures 5, 6:
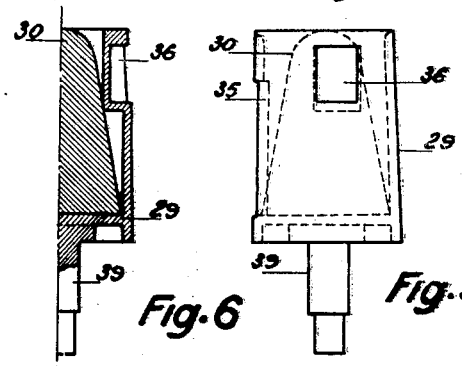
Fig. 5 is a detached side elevation of the rotary shell of the cock.
Fig. 6 is a half section of the rotary shell of the cock, taken on the line $z$—$z$ (Fig. 8).
Figure 4:
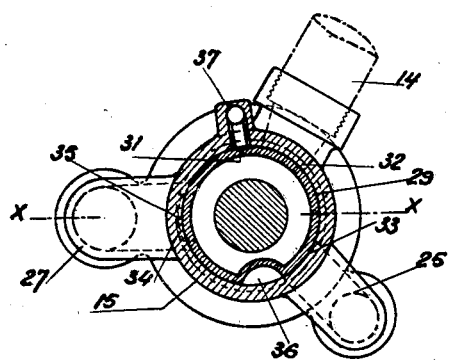
Fig. 4 is a horizontal section on the line $y$—$y$ (Fig. 3) of the cock having a rotary shell showing the connection of said cock with the liquid inlet and outlet pipes.

In the drawings, Fig. 3 to 15 inclusive are drawn to a larger scale than Fig. 1 and 2 and similar parts are designated by similar references throughout the several figures.

The apparatus, as shown, comprises a pump 1 actuated for example by a crank shaft 2 and adapted to raise the liquid to be measured and delivered from an underground well (not shown) through an uptake pipe 3 and to force said liquid through a feed pipe 4 to an overhead tank 5 closed at its upper part by a cover 6 having a centrally disposed upright tube 7. The tube 7 forms a housing for a wire or metal cable 8 vertically suspending and actuating an annular plunger 9 (see Fig. 9), the latter being connected the wire 8 by a conical member 10 provided with rods 11 secured to said plunger and having a relatively small volume.

When the liquid fed by the pump 1 into the tank 5 reaches a level therein corresponding with the outlet port leading into a pipe 12 which follows down the side of the apparatus and opens into the well so that the liquid may return to the well. The lower part of the tank 5 is connected with the outlet 13 of a downwardly disposed pipe 14 through which the liquid can flow to a three way cock 15 having a rotary shell.

The plunger 9 is guided for vertical motion in a bell-like glass vessel 16 wherein the overflowing and transferring of the liquid take place and can be visually observed. The glass bell 16 (of suitable height) rests on a bottom plate 17 fitted with a liquid-tight gasket 18, the glass bell being closed at its upper end by a metal lid 19 having a hole through which the cable 8 passes, the lid being held on the bell 16 by the inner flange of a cylindrical metal housing 20 having wide windows 21 formed therein. The height of the housing 20 is reckoned so that its connection with the bottom plate 17 by screws (not shown) ensures that the glass bell 16 is firmly seated in the gasket 18.

The lid 19 does not contact with the bottom of the overhead tank 5 and is provided with a conical wall to snugly house the members 10 and 11 connecting the plunger to the cable 8 when said plunger reaches the top of its stroke.

In order to allow for a certain variation in the height of the bell 16 while making it unnecessary to adjust the length of the pipes 4, 12 and 14 when the bell 16 is replaced by another bell or when the housing 20 is tightened, and in order to leave the tightening of the housing quite independent, the overhead tank 5 is supported by the bottom plate 17 on small columns 22 which support the bottom of said tank slightly above and independent of the lid 19 and housing 20.

The bottom plate 17 is fitted with a centrally disposed tube 23 leading to the interior of the cock 15, the tube having a height so that the plunger 9 mounted concentrically thereof may be wholly immersed beneath the overflow level, as determined by the upper end of the tube 23. The bottom plate 17 rests upon a metal body 24 which is a cylindrical member and forms a unit of the built-up structure of the entire apparatus. The body 24 is fitted with suitable doors and ports and is adapted to protect the moving parts of the mechanism and to be superimposed on a base unit 24a which is normally cemented in a ground foundation.

The cock or valve 15 (see Figures 1 to 6) is affixed to and depends from the under side of the plate 17. The wall of the valve is provided with three side ports 32, 33 and 34, which allow the centrally located tube 23 to respectively communicate through the ports, with the tank 5 through the pipe 14, then with the well for discharging the overflow liquid through the tubes 25 and 26 which can be conveniently connected to the central pipe 12 and finally with the outlet port 34 through which passes the liquid to be delivered by the tube 27. Such successive communications are performed by causing the side ports 32, 33 and 34 to register with the port 35 formed in the rotary shell 29 (see Figure 5) of the valve.

The inner capacity of the rotary shell 29 is reduced by being provided with a tapering member 30 and having a rounded off tip. This member 30 may have any shape provided it does not interfere with the required flow of liquid. The reduction in the capacity of the shell is intended to lessen the volume of liquid in the chamber comprising the overflow tube 23 and shell 29. In fact, should this volume of liquid be sufficiently large, its discharge before the locking position as will be described hereinafter, might be insufficient and the head of liquid above the piston 67, might still be large enough to actuate said piston regardless of any back flow of an excess of liquid from the bell 16.

The ports formed in the wall of the cock 15 and the port formed in the shell 29 are so disposed as to cause the liquid to flow entirely out when said cock is open.

A feature of the delivering cock resides in an additional side port 31 adjacent the inlet port 32, so that during a small angular displacement of the cock, this port 31 is brought into direct communication with the inlet port 32 as soon as the outlet port 35 in the shell 29 has begun to register with the outlet port 33 of the overflow tube.

The port 31 is located at a sufficient height for not being opened when the port 35 in the shell 29 is brought to a corresponding angular position. Said port 31 communicates with the liquid inlet port 32 by a groove 36 (of suitable height and width) formed longitudinally in the outer wall of the shell 29. The port 31 further communicates by a duct 37 with a vertical tube 38 (Figs. 1 and 2) passing through the bottom plate 17 and a sleeve 9a fitted in the plunger 9, the upper end of said tube (of smaller sectional area than the overflow tube 23) being located in the bell 16 at a level higher than that of the upper end of the overflow tube 23.

When the groove 36 establishes communication between the port 31 and the inlet port 32, the tube 38 will allow the liquid from the tank 5 to flow in through the pipe 14 to enter the bell 16. Simultaneously the outlet port 35 in the shell 29 has started to open the overflow port 33. Consequently during a small fraction of the rotation of the shell 29, some liquid is bound to enter through the tube 38 while some liquid will surely overflow through the tube 23, the port 35 and the port 33, the liquid overflowing more rapidly than it is admitted through the pipe 38 owing to the small area of the port 31 by comparison with the area of the ports 33 and 35.

The shell 29 of the cock 15 is centrally fitted with a depending tail 39 connected to a vertical shaft 41 by a sheath 40 by means of two cotter pins 42 located in perpendicular planes; these pins have a certain amount of play in the vertical plane whereby small adjustments can be made in the alignment of the tail 39 and shaft 41 and the looseness of the cock 15 as a result of wear can be taken up, the shell 29 being raised by a spring 43 interposed between the bottom of said shell and a tray 44 carried by the bottom of the cock 15.

As illustrated in Figs. 1 and 2, the shaft 41 has keyed thereon a worm pinion 45 actuated by a worm 46 keyed upon a horizontal shaft 47, this worm driving a further worm pinion 48 keyed on a horizontal shaft 49 fitted with a cam 50. The pinions 45 and 48 rotate at the same speed and the cam 50 effects one revolution while the shell 29 effects one revolution.

The cam 50 is engaged by a roller 51 fitted upon a lever 51a on which is fixed the end of the cable 8 passing on a jockey pulley 51b. When rotating, the cam 50 shifts the plunger 9 vertically in such a manner that it should be at the upper end of its stroke when the liquid inflow is completed, the plunger remaining at such position during the liquid levelling and lowering before the liquid delivery, thereafter it should remain stationary at the lower end of its stroke during the whole duration of the delivery. The foregoing operations are cyclically performed at each revolution of the cock shell 29, the latter constantly rotating in the same direction.

The shaft 47 is driven by a sprocket pinion 52 meshing with a chain 2a passing on another sprocket pinion 53 mounted upon the shaft 2 of the pump 1.

The pinion 52 is secured to a plate 54 mounted so as to freely rotate on the shaft 47 without moving longitudinally with respect thereto. Against the plate 54 bears a companion plate 55 splined on the shaft 47 so as to be able to move longitudinally thereon. A coil spring 56 fitted around the shaft 47 and abutting on a shoulder 57, constantly presses the plate 55 against the plate 54, balls 58 being interposed between said two plates and housed in pockets formed in the plate 54, such pockets having a depth larger than their radius whereby they are constantly driven by said plate. The portion of these balls protruding from the face of the plate 54 engages pockets (of conical, spherical or other suitable shape) formed in the plate 55. These pockets are of less depth than the radius of the balls so that the spring 56 tends to bring the plates 54 and 55 together whereby, as the plate 55 is splined upon the shaft 47, the rotation of the latter tends to drive the balls 58 that are entrained by the plate 54 out of the pockets in the plate 55 by pushing the latter apart while compressing the spring 56.

To conveniently adjust the tension of the spring 56, the plate 55 must thus be driven by the plate 54 and the shaft 47 must be rotated. Should the shaft 47 jam, the balls would readily get out of the pockets in the plate 55 whereby the driving effect due to the wedging of the balls 58 would be replaced, due to said balls rolling between the plates 54 and 55, by a very small stress until the said balls snap again into the pockets in the plate 55. Should at that instant the shaft 47 and plate 55 be disengaged, the two plates would be re-engaged whereby the shaft 47 would be driven again. In the reverse case, the balls would easily pass over the pockets without snapping thereinto and the plate 54 would continue to freely rotate with the pump 1, the rest of the mechanism remaining stationary and receiving no tangential stress since the balls 58 rotate.

The aforesaid device is necessary owing to the fact that the pump 1 can be expected to operate when the cock-cam-plunger mechanism must remain stationary either by the action of safety devices to be described hereinafter, owing to the deficiency or excess of liquid in order to accurately deliver selected quantities of liquid, or owing to the selected quantity of liquid having been actually delivered.

On the vertical shaft 41 (see Figs. 1, 2, 11 and 12) is keyed a plate 59 formed at suitable different positions, in the height of its cylindrical wall 73, with holes 60, 61 and in its peripheral wall with a hole 62. These holes are suitably located so that the latches to be described hereinafter can engage therewith and thus stop the rotation of the shaft 41 and shell 29 at positions respectively corresponding to the beginning and end of the levelling operation and to the end of the delivery operation.

Such stoppages are performed, in the presen embodiment, by means of the following devices:

The tube 25 mounted upon the cylindrical casing 63 leads to a chamber having a cylindrical wall 63a formed with ports 64 communicating through an annular space 65 with the mouth 66 of the tube 26 leading to the well.

Within the chamber 63a can be moved a piston 67 the rod 67a of which actuates a lever 68 which shifts the latches 69 and 71 diametrically located opposite the shaft 41. These latches are arranged at different levels and can be respectively arres ed in the holes 60, 61 of the plate 59 or slide on its wall. The latch 69 is connected to the latch 71 by a cranked rod 70. A spring 72 forces the members 69, 70, 71 towards the shaft 41 and tends to raise the piston 67. On engaging the hole 60, the latch 69 closes the ports 64.

The spring 72 is tensioned to cause the piston 67 to be lowered and thus to bring the latch 69 to the right only when the head of liquid located thereabove reaches a level between certain limits measured from the bottom of the cock shell 29.

The volume of the tube 25 and of the cylinder 63 above the piston 67, between the above-cited level and the opening position of the ports 64, is such that it exceeds the combined volume of the tube 23 and inner capacity of the shell 29. The cavities in which the latches are accommodated occupy such a position that the ports 64 are opened when the latch 69 contacts with the periphery of the plate to prevent liquid being trapped in the cylinder 63 be ween two consecutive overflowing operations. When the latch 71 contacts with the periphery 73 of the plate, the ports 64 are completely open. When the hole 60 is about to register with the latch 69, there is no liquid in the tube 25 and cylinder 63. The spring 72 then pushes the latch 69 into a cavity 74 located ahead of the hole 60 and thus raises the piston 67 to a position closing the ports 64. Immediately after, the port 35 in the shell 29 commences to open the port 33 thus establishing communication between the tubes 23 and 25. At the same time, the groove 36 establishes communication between the pipes 38 and 14 which brings the liquid from the tank 5 by way of the duct 31 and port 32.

The several alternative operative conditions of the apparatus that may prevail are as follows:

1.—Somehow the pump does not operate and the tank 5 being thus empty, no liquid has entered the shell 29 and tube 23. As the latter are empty, no liquid flows through the tube 25 and cylinder 63 whereby the piston 67 is raised and the latch 69 snaps into the hole 60, thus stopping the cock-cam-plunger mechanism without however stopping the pump 1. In such stopped position the tank 5 communicates, as aforesaid, with the tube 38 through the hole 31, the groove 36, the port 42 and the tube 14.

2.—Due to the tank 5 not being wholly emptied, some liquid has passed through the tube 23 into the glass bell 16 but somehow (as for example owing to the rotation being too rapid or to the pump not delivering enough liquid) the level of the liquid in the bell 16 has not exceeded the upper level of the tube 23. Such being the case, as soon as the rotation of the plate 59 has brought 74 forming a lateral extension of the hole 60 in coincidence with the latch 69, the latter snaps thereinto. The ports 64 are then closed by the raising of the piston 67 under the pressure exerted by the spring 72. Before the latch 69 is engaged into the hole 60, the liquid which was trapped in the tube 23 and the shell 29 escapes through the port 35 which commences to open the port 33 and flows into the pipe 25 and cylinder 63. However the height of the liquid is not sufficient for actuating the piston 67 and compressing the spring 72 whereby the latch 69 snaps into the hole 60 and stops the mechanism, as aforesaid.

In both events, assuming some liquid still entering the tank 5 as a result of the operation of the pump 1 which may have continued owing to the automatic disengaging means as above-described, a certain quantity of liquid will flow from the tank 5 to the bell 16 through 32, 36, 31, 37, 38 and will reach the upper level of the tube 23 whence it will pass to 29 and 25 through the ports 35 and 33. When the height corresponding to the actuation of the piston 67 will have been reached, said piston will be lowered whereby the lever 68 will disengage the latch from the hole 60 by compressing the spring 72; the motion of the cock-cam-plunger unit will then be resumed and, as the groove 36 will no longer communicate with the duct 31, no liquid will pass through the overflow 23, the cock shell 29, the ports 35, 33, the tube 25 and the ports 64. As the latch 69 will be beyond the hole 60, it will not snap into it even if the cylinder 63 is empty.

3.—Assuming now the feeding conditions to have been normal, the level of the liquid prior to the opening of the overflow is higher than the top of the tube 23. When the port 35 commences to open the port 33, the latch 69 which has previously penetrated into the notch 74 is pulled to the right as a result of the lowering of the piston 67 (since the level of the liquid exceeds the top of the tube 25) whereby the ports 64 are opened and the latch 71 abuts the wall 73 of the plate 53. Therefore the latch is not arrested in the hole 60, the motion is continuous, the overflowing liquid flows through the port 33 then completely opened by the port 35 and thence through the pipe 25 and the ports 64.

When the ports 35 and 33 are no longer opened, the two operative conditions may be as follows:—

1.—If the operation is normally adjusted, the overflowing operation is already completed, the tubes 23 and 25 and the shell 29 are then empty, the piston 67 is raised back, the latch 69 abuts the cylindrical wall 73 and the latch 71 does not engage the notch 75; it can not therefore engage the hole 61 whereby the closure is performed without the cock-cam-plunger mechanism being stopped.

2.—Such will be the case if, at the time the notch 75 registers with the latch 71, the level of the liquid in the tube 25 is lower than the bottom of the shell 29 and has not a sufficient height for compressing the spring 72.

In both cases, at the time the overflow is closed, when the port 35 no longer registers with the port 33, the tube 23 and the shell 29 will be empty.

4.—When the port 35 is about to close the port 33, if there remains in the tube 25 a sufficient head of liquid for compressing the spring 72 and pressing the latch 71 towards the shaft by acting on the piston 67, said latch 71 will enter the notch 75 and, assuming at the time the overflow is about to be completely closed, the pressure not having gone down while allowing the piston 67 bringing the latch 69 against the wall 73 to go up, while disengaging the latch 71, said latch will be arrested in the hole 61 and will thus stop the operation of the cock-cam-plunger mechanism. The operation will only be resumed when, the overflowing liquid continuing to flow away through the non-completely closed ports 35 and 33, the level of the liquid in the tube 25 will have become insufficient for compressing the spring 72. The latter will then disengage the latch 71 and, at this time, as the shell 29 and the tube 23 will be empty, the motion will start again whereby the port 35 will pass beyond the port 33 and close the overflow.

As will be understood, it is impossible to pass from the inlet phase of the liquid into the bell 16 to the delivery phase of said liquid through the overflow tube 23, the shell 29, the port 35 and the tubes 34, 27 and 28 as long as the overflowing operation has not been correctly started or wholly completed.

The rotary plate 59 (see Figs. 11 and 12) is formed in its peripheral wall with a hole 62 ahead of which is a notch 76 which may engage a latch 77 on which is coiled a spring 78 the effect of which is to prevent said latch 77 from snapping into the hole 62 and notch 76.

The latch 77 is pushed by the spring 78 (Fig. 15) against the centre of an inclined deformable diaphragm 79 (having any suitable shape e. g. a corrugated shape) fitted on one wall of a valve chamber 80 connected with the tube 27.

An upstanding abutment pin is located across the chamber 80 opposite the latch 77 for limiting the inward stroke of the diaphragm 79 under the influence of the spring 78.

Assuming the tube 27 to be of sufficient height and the spring 78 to be suitably tensioned, it will be understood that for a certain level of the liquid in said tube 27, the diaphragm by yieldingly moving outwardly will push the latch 77 which will thus enter the notch 76 and, by engaging the hole 62, will stop the plate 59 and arrest the rotation of the cock-cam-plunger unit.

The latch 77 can snap into the hole 62 when the port 35 having opened the port 34 is about to close it again. If somehow at that instant some liquid is still contained in the tube 27 at a higher level than that determined by suitably tensioning the spring 78, the diaphragm 79 will be deformed and will push the latch 77 into the notch 62 whereby the cock-cam-plunger mechanism will be stopped.

The rotation of the cock-cam-plunger unit can be resumed only when the liquid to be delivered has been discharged to reach in the tube 27 a level lower than the bottom of the outlet port 35 of the cock shell 29. At that moment, no liquid forced by the plunger 9 through the tube 23 and shell 29 can stagnate in the latter which can thus be closed again for initiating a new delivery operation, the previous one being wholly completed.

The diaphragm 79 can take the form of a thin disk having concentric undulations; its centre can be reinforced to avoid distortion and transmit the whole pressure which normally acts on this portion of the diaphragm surface. This diaphragm can have a circular surface as barometric capsules and may be zig zag shaped; it can be made of metal or other suitable material such as india rubber (either of the usual type or vulcanized by means of selenium), thin ebonite, bakelite, celluloid, cellulose or any substance not liable to be damaged by the liquid to be delivered.

The diaphragm 79 can act on the latch 77 (as shown in Fig. 1) or on any other suitable gear.

As illustrated in Figs. 1, 2, 9 and 10, the plunger and its suspension device present the following structure:

The cable 8 is fastened either directly to the plunger 9 or preferably by means of a hook 10a to an intermediary conical member 10 suitably cut away to provide a passage for the tube 38 and fitted on its periphery with three thin cylindrical rods 11 screwed into blocks 11a made integral with the top of the plunger 9. The latter comprises top and bottom elements welded or brazed together to provide a hollow cylindrical vessel having a central passage. The top element of the plunger may be made of sheet metal shaped to the required form while its bottom element is made of thicker metal to provide stability. As the capacity of the vessel so delineated by the top and bottom elements can not be made accurate enough whilst the volume of the plunger must be mathematically standardized, the following means are used for taking up any errors in the required capacity:

The bottom element of the plunger 9 carries at its lower end and concentrically to the central hole 9b a circular cylindrical flange 9c the cross section of which has an accurately reckoned area, which can be obtained by machining it on very precise calcuations. Thus the error of volume after the assembly of the machined top and bottom elements can be exactly known; as such error can always be rendered positive, it is possible, by knowing the section of the flange 9a, to exactly determine to what extent the height of said flange must be reduced to give the required volume.

As however a slight error might still exist despite the above precautionary steps, the bottom element of the plunger is provided with a threaded part 9d the screwing or unscrewing of which permits the required correction to be readiy effected.

The tube 38 passes through the plunger 9 and is housed in the sheath 9a welded or brazed thereto at both ends. The upper end of the tube 38 is situated at a level somewhat higher than that of the overflowing tube 23.

The meter or dialling device shown in Figs. 2, 13 and 14 and adapted to determine the quantity of liquid to be delivered in each instance is actuated by the shaft 49 of the cam 50. On this shaft is made fast a circular plate 86 having a suitably shaped notch 87 into which can snap a lug 89 (for example of frustoconical shape) carried by a rod 88 having a shoulder 88a which rod can slide to the right under the action of a spring 90 abutting on the bottom of a recess formed in a bracket 91 for accommodating said rod 88. The latter is normally of such a length as to abut a disk 93 when the spring 90 is compressed and the lug 89 is out of the notch 87. As a result of this, the plate 86 and shaft 49 can then rotate. On the disk 93 is keyed a dial 94 the purpose of which is to tell the volume of liquid to be delivered by causing figures to become visible through a window 96 formed in the wall of the body 24 of the apparatus.

When the dial 94 occupies the zero position, a notch 92 formed in the disk 93 permits the rod 88 to be shifted to the right and as, for constructional reasons, the zero position coincides with the passing of the notch 87 opposite the lug 89, a stopping effect is secured in that position which corresponds to the complete closure of the shell 29 after the delivery operation.

If the disk 93 were made fast on the shaft 49 itself, a stoppage would ensue at each revolution and the dial would only tell one delivery unit. In fact the dial 94 is marked in a clockwise direction with a number of volumes of liquid to be delivered corresponding to a number of complete cycles, for example, ten figures showing volumes spaced to the extent of 5 liters from 0 to 45 liters. Such figures appear on half the circumference whereby they are spaced by 1/20 revolution or more generally by $1/2n$ revolutions assuming the number of figures to be designated by $n$.

A similar dial 95 located in parallelism and rotating about the same axis as the dial 94 is arranged in front of the latter. The dial 95 is graduated in a similar way on a half circumference only but its graduations are arranged in a counter-clockwise direction.

The portion of the dial 95 which bears no figures is cut away to the extent of 180° so that the figures appearing on said dial may be seen through a window 97 located symmetrically to the window 96 while the figures on the dial 94 are still visible through the window 96.

The disk 93 and the dials 94, 95 are mounted on a spindle 98 carried in a bearing 99 supported by the bracket 91. The spindle 98 is free to rotate and move longitudinally and passes through the body 24 of the apparatus. On the spindle 98 is provided a shoulder 100 pushed to the left by a spring 101 coiled around the spindle 98 and abutting the body 24. An operating knob 102 adapted to be actuated manually is externally fitted on the spindle 98. The latter also carries a further shoulder 103 located on the opposite side of the dial 95. A longitudinal play is provided between the shoulders 100 and 103 whereby the dial 95 can be shifted to the right when the spindle 98 is pulled in the same direction by means of the knob 102. The shoulder 100 tends to bring the dials 95 and 94 together under the action of the spring 101 when the knob 102 is not acted upon. The dial 95 can freely rotate on the spindle 98 and is weighed so that gravity should always bring the zero of its graduation opposite the window 97 wherein appear the figures showing the quantities of liquid already delivered.

The dial 95 pushed by the spring 101 is normally connected to the dial 94 by means of a roughened intermediate washer 95a made of a non-sliding material, said washer by being compressed between said dials providing for a sufficient adhesion for causing the dial 94 to drive the dial 95. The washer 95a can either be separate or made integral with either dial.

The disk 93 connected to the dial 94 is splined on the spindle 98 so as to be slidable thereon. When the shoulder 103 pulled by the spindle 98 has moved the washer 95a off the dial 94, the disk 93 is shifted to the right together with said spindle. This result is obtained due to a pin 98a and slot connection 98b providing for the required longitudinal play.

The hub of the disk 93 is formed endwise with teeth 104 the number and position of which correspond to the spaces between the figures marked by the dial 94 i. e. twenty teeth in the present embodiment.

The teeth 104 correspond to similar teeth formed in the hub 105 engaged for free rotation on the spindle 98, thus providing a dog clutch.

The hub 105 is rotated by the two companion clutches 106, 107 driven by the pinion 108 fixed to the shaft 49 in such a way that when said shaft makes one revolution the said hub, the disk 93 and the dial 94 made $1/20$ of a revolution or more generally $1/2n$ revolution, assuming the dial to bear $n$ figures.

The operation of the meter and dialling device is then as follows: Assuming a liquid delivery to have just been completed, the rod 88 snaps into the notch 92 in the disk 93. The lug 89 is then engaged in the notch 87 in the plate 86 and locks the mechanism. At that time, the dial 94 shows the zero through the window 96 while the dial 95 shows through the window 97 a number corresponding to the volume of liquid that has just been delivered.

If for example it is desired to deliver 15 liters of liquid (corresponding to three full cycles of the cock-cam-plunger delivery mechanism) the spindle 98 is shifted by pulling out and turning the knob 102 whereby the dial 95 is first moved to the right, the washer 95a then ceasing to be pressed by the shoulder 100 against the dial 95 which thus becomes free. Due to its being weighed, the dial 95 then turns immediately and the 0 of its graduation shows through the window 97.

Assuming the motion to be continued, the disk 93 carrying the dial 94 is in turn driven by the spindle 98, the rod 88 then being disengaged from the notch 92 due to the retraction of the disk 93. As the teeth 104 are then separated from the teeth formed on the hub 105, the knob 102 and spindle 98 can be turned until the figure "15" appears through the window 96, as is required. If the knob 102 and the spindle 98 are then released, the spring 101 pushes the shoulder 100 and dial 95 back, forces the washer 95a against the dial 94 and disk 93 whereby the hub 105 meshes with the teeth 104.

Simultaneously with the rotation of the dial 94 and disk 93, the notch 92 is also moved angularly. When under the action of the spring 101, the spindle 98 and the disk 93 resume their position to the left which pushes the rod 88 back and frees the plate 86 and the whole delivery mechanism due to the lug 89 coming out of the notch 87.

At the first revolution of the shaft 49, the lug 89 can not snap into the notch 87 due to the rod 88 not registering with the notch 92 which has been initially shifted to the extent of $3/20$ of a revolution. The stopping effect can only take place at the third revolution when the shaft 49 has turned three times and 15 liters of liquid have been delivered, the dial 94 then having rotated together with the disk 93 to the extent of $3/20$ of a revolution. The dial 94 will—assuming the direction of rotation being correct—be brought back from 15 to 0. At the same time, the dial 95 which originally showed the zero position will have, simultaneously with the dial 94, rotated to the extent of $3/20$ of a revolution and will show number "15". As soon as the required 15 liters of liquid have been delivered, the delivery will be stopped automatically. The apparatus will only be freed by the preparation of a further delivery the indexing number of which will be caused to appear through the window 96, and so on.

Figure 15:
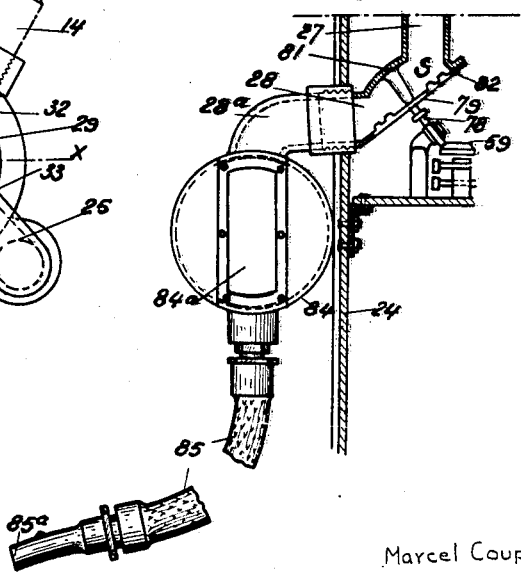
Fig. 15 is a vertical section of the safety valve permitting the volume of liquid forced by the plunger to fully flow out, said valve being interposed between the delivery cock and the liquid delivery nipple.

With a view to hastening the succession of liquid delivery cycles in the present apparatus by permitting two cycles to overlap without the flow of liquid through the tube 18 being necessarily integral at each delivery cycle, there is provided (as shown in Fig. 15) between said tube and the flexible hose 15 an auxiliary tank 84 having one glass wall or two oppositely disposed glass walls through which the flow of liquid can be observed. This tank permits the delivery liquid to rapidly escape through the tube 27 and thus prevents a stoppage of the cock-cam-plunger mechanism at the end of the delivery stroke in case the hose 85 should have too small a cross-sectional area. By this means, the liquid contained in the tank 84 can continue flowing out through the hose 85 during the next operative cycle. Thus at the beginning of the next delivery, the tank 84 may be empty or more or less filled with liquid. If the tank 84 is still full, the liquid forced by the plunger 9 at the next cycle will remain in the pipe 27 and thereabove. At that time, the safety valve S will operate and the cock-cam-plunger mechanism will be stopped till the time the tube 27 will be sufficiently emptied for avoiding any portion of the measured liquid being trapped by the shell 29.

By giving the tank 84 a sufficient capacity, it will be possible to perform a regular and continuous flow of the liquid through the restricted nipple 85a fitted on the hose 85 without any stoppage between each cycle and at a higher average delivery speed.

In the construction shown in Fig. 15, the tank 84 is connected to the tube 28 of the safety valve S by an elbowed union 28a. The elbow and the tank are arranged for not trapping the liquid which flows towards the delivery nipple 85a, the latter being usually of relatively small cross-sectional area.

It will be appreciated that various modifications might be introduced in the minor constructional details of the above-described apparatus without departing from the scope of the invention.

What I claim is:

1. A liquid measuring and delivering apparatus comprising, in combination, a supply well, a tank connected to said well, a pump for forcing the liquid from the well into the tank, a three way cock fitted with a rotary shell and having its three ways respectively connected with the tank, with the well and with the liquid delivery tube, a vessel surmounting the cock and adapted to receive the liquid to be delivered from the tank and through the cock, a plunger of predetermined volume housed for vertical motion within said vessel, movable suspension means for the plunger, an upstanding overflow tube connected to the cock and projecting in the vessel to a height larger than that of the plunger, a gear for transmitting the rotation of the pump to the cock shell, piston means arranged in the discharge tube from the cock to the well and connected with the plunger suspension means for preventing the plunger from being immersed before the liquid has reached the overflowing level in the vessel, and valve means arranged in the delivery tube and connected with the cock shell and with the plunger suspension means for preventing the plunger from being lifted in the vessel before the liquid displaced by its immersion has been fully discharged through the overflow and delivery tubes.

2. A liquid measuring and delivery apparatus comprising, in combination, a supply well, an overhead tank connected to said well, a pump for forcing up the liquid from the well into the tank, a three way cock fitted with a rotary shell and having its three ways respectively connected with the tank, with the well and with the liquid delivery tube, a glass vessel surmounting the cock and adapted to receive the liquid to be delivered from the tank and through the cock, an annular plunger of predetermined volume housed for vertical motion within said vessel, movable suspension means for the plunger, an upstanding overflow tube connected to the top of the cock, registering with the central recess in the plunger and projecting in the vessel to a height larger than that of the plunger, a worm and sprocket gear for transmitting the rotation of the pump to the cock shell, a clutch associated with said gear for automatically declutching the cock shell from the pump when the cock stops while the pump is still rotated, piston means arranged in the discharge tube from the cock to the well and connected with the plunger suspension means for preventing the plunger from being immersed before the liquid has reached the overflowing level in the vessel, and valve means arranged in the delivery tube and connected with the cock shell and with the plunger suspension means for preventing the plunger from being lifted in the vessel before the liquid displaced by its immersion has been fully discharged through the overflow and delivery tubes.

3. A liquid measuring and delivering apparatus comprising, in combination, a supply well, an overhead tank connected to said well, a pump for forcing up the liquid from the well into the tank, a three way cock fitted with a rotary shell and having its three ways respectively connected with the tank, with the well and with the liquid delivery tube, a glass vessel surmounting the cock and adapted to receive the liquid to be delivered from the tank and through the cock, an annular plunger of predetermined volume housed for vertical motion within said vessel, movable suspension means for the plunger, an upstanding overflow tube connected to the top of the cock, registering with the central recess in the plunger and projecting in the vessel to a height larger than that of the plunger, a worm and sprocket gear for transmitting the rotation of the pump to the cock shell, a pair of clutch plates formed with pockets yieldingly housing intermediate balls and associated with said gear so as to automatically declutch the cock shell from the pump when the cock stops while said pump is still rotated, piston means arranged in the discharge tube from the cock to the well and connected with the plunger suspension means for preventing the plunger from being immersed before the liquid has reached the overflowing level in the vessel, and valve means arranged in the delivery tube and connected with the cock shell and with the plunger suspension means for preventing the plunger from being lifted in the vessel before the liquid displaced by its immersion has been fully discharged through the overflow and delivery tubes.

4. A liquid measuring and delivering apparatus comprising, in combination, a supply well, an overhead tank connected to said well, a pump for forcing up the liquid from the well into the tank, a three way cock fitted with a rotary shell and having its three ways respectively connected with the tank, with the well and with the liquid delivery tube, a glass vessel surmounting the cock and adapted to receive the liquid to be delivered from the tank and through the cock, an annular plunger of predetermined volume housed for vertical motion within said vessel, movable suspension means for the plunger, an upstanding overflow tube connected to the top of the cock, registering with the central recess in the plunger and projecting the vessel to a height larger than that of the plunger, a worm and sprocket gear for transmitting the rotation of the pump to the cock shell, a clutch associated with said gear for automatically declutching the cock shell from the pump when the cock stops while the pump is still rotated, piston means arranged in the discharge tube from the cock to the well and connected with the plunger suspension means for preventing the plunger from being immersed before the liquid has reached the overflowing level in the vessel, valve means arranged in the delivery tube and connected with the cock shell and with the plunger suspension means for preventing the plunger from being lifted in the vessel before the liquid displaced by its immersion has been fully discharged through the overflow and delivery tubes, and dialling means actuated by the cock-cam-plunger unit for indicating the respective volumes of liquid to be delivered and actually delivered, said dialling means being adapted to stop said unit when the required volume of liquid has been completely delivered.

5. A liquid measuring and delivering apparatus comprising, in combination, a supply well, an overhead tank connected to said well, a pump for forcing up the liquid from the well into the tank, a three way cock fitted with a rotary shell, said cock having its three ways respectively connected with the tank, with the well and with the liquid delivery tube and further having a side port adjacent the intake from the tank but positioned so as to never register with the shell port, the wall of the cock shell being formed with a groove adapted to establish communication between said side port and said intake, a vessel surmounting the cock and adapted to receive the liquid from the tank and through the cock, an annular plunger of predetermined volume housed for vertical motion within said vessel, movable suspension means for the plunger, an upstanding overflow tube connected to the top of the cock, engageable through the central recess in the plunger and projecting in the vessel to a height larger than that of the plunger, an upstanding tube of smaller section than the overflow tube connected to the side port in the cock and projecting in the vessel to a height larger than that of the overflow tube, a worm and sprocket gear for transmitting the rotation of the pump to the cock shell, a spring clutch associated with said gear for automatically declutching the cock shell from the pump when the cock stops while the pump is still rotated, piston means arranged in the discharge tube from the cock to the well and connected with the plunger suspension means for preventing the plunger from being immersed before the liquid has reached the overflowing level in the vessel, and valve means arranged in the delivery tube and connected with the cock shell and with the plunger suspension means for preventing the plunger from being lifted in the vessel before the liquid displaced by its immersion has been fully discharged through the overflow and delivery tubes.

6. In a liquid measuring and delivering apparatus, the combination of axially movable plunger, a tank for the liquid into which the plunger is immersed, an overflow pipe for the tank, a rotary shell in communication with said overflow pipe, a three-way cock in said shell and having one of its ways connected with the tank containing the liquid to be delivered, the other two ways, respectively, being connected with a well to receive the overflow liquid and with a delivery nozzle, and safety devices for said cock comprising valves or pistons, one thereof being adapted to counteract the immersion of the plunger until the liquid in said tank reaches the upper end of the overflow pipe, another being adapted to prevent the plunger from raising in said tank until the level of the liquid flowing to the delivery nozzle has reached the elevation to overflow into said overflow pipe, and a dial meter device responsive to the axial movement of the plunger to indicate the amount of liquid desired to be delivered and the amount actually delivered.

In testimony whereof I affix my signature.

MARCEL COUPIER.